United States Patent
Bell et al.

(10) Patent No.: US 9,030,377 B2
(45) Date of Patent: May 12, 2015

(54) SMART DEVICE NOTIFICATIONS FOR SURFACE COMPUTING

(71) Applicant: International Business Machines Corporation, Armonk, NY (US)

(72) Inventors: Denise A. Bell, Austin, TX (US); Jana Jenkins, Research Triangle Park, NC (US); Jeffrey A. Kusnitz, San Jose, CA (US); Sarah Plantenberg, San Francisco, CA (US)

(73) Assignee: International Busines Machines Corporation, Armonk, NY (US)

( * ) Notice: Subject to any disclaimer, the term of this patent is extended or adjusted under 35 U.S.C. 154(b) by 14 days.

(21) Appl. No.: 13/954,943

(22) Filed: Jul. 30, 2013

(65) Prior Publication Data

US 2015/0035721 A1  Feb. 5, 2015

(51) Int. Cl.
  *G09G 5/00* (2006.01)
  *H04M 3/42* (2006.01)
  *H04M 19/04* (2006.01)
  *G06F 3/14* (2006.01)

(52) U.S. Cl.
  CPC ........... *H04M 19/048* (2013.01); *G06F 3/1423* (2013.01)

(58) Field of Classification Search
  USPC ........................................................ 345/1.2
  See application file for complete search history.

(56) References Cited

U.S. PATENT DOCUMENTS

| 7,474,889 B2 | 1/2009 | Bhakta et al. |
| 2008/0207184 A1* | 8/2008 | Wassingbo et al. ........... 455/417 |
| 2009/0030909 A1* | 1/2009 | Bramucci ....................... 707/10 |

* cited by examiner

*Primary Examiner* — Charles V Hicks
(74) *Attorney, Agent, or Firm* — Steven Greenberg, Esq.; CRGO Law

(57) ABSTRACT

Embodiments of the present invention provide a method and system for smart device notifications in surface computing. In an embodiment of the invention, a method for smart device notifications in surface computing includes registering in memory of a surface computing system, a placement of multiple different smart devices upon a surface of the surface computing system. The method also includes detecting a receipt of a notification in one of the smart devices. Finally, the method includes rendering in a visual display of the surface computing system, an indication of a particular one of the smart devices in which the receipt of the notification is detected.

6 Claims, 1 Drawing Sheet

SMART DEVICE NOTIFICATIONS FOR SURFACE COMPUTING

BACKGROUND OF THE INVENTION

1. Field of the Invention

The present invention relates to surface computing and more particularly to smart device notification integration with surface computing.

2. Description of the Related Art

Surface computing refers to the use of an ordinary flat surface as the primary mode of interaction with a computing device and the acceptance of common objects to direct user inputs in the computing device. Generally, a combination of one or more digital projectors and an array of cameras permit both the projected display of the graphical user interface of a surface computing system onto a flat surface, and also the detection of user input on the flat surface. Practical applications of surface computing include hotel lobby kiosks, airline check-in terminals, hospital nursing stations and group conference room tables.

Within the context of group conferencing, in an era of mobile phone usage, commonly each member of an in-person group conference carries at least one mobile phone. So as to not disrupt the proceedings of the group conference, each attendee of an in-person group conference generally silences the audible notifications of a corresponding mobile phone and instead, activates a vibrate mode of notification. Further, so as to prevent the visual distraction a notification, oftentimes each attendee will place the mobile phone face down onto the conference room table. Consequently, when a vibration is detected on the conference room table, it remains unclear as to which mobile phone has produced the notification resulting in an unwanted disruption of the group conference.

BRIEF SUMMARY OF THE INVENTION

Embodiments of the present invention address deficiencies of the art in respect to mobile phone notifications during group conferencing and provide a novel and non-obvious method, system and computer program product for smart device notifications in surface computing. In an embodiment of the invention, a method for smart device notifications in surface computing is provided. The method includes registering in memory of a surface computing system, a placement of multiple different smart devices upon a surface of the surface computing system. The method also includes detecting a receipt of a notification in one of the smart devices. Finally, the method includes rendering in a visual display of the surface computing system, an indication of a particular one of the smart devices in which the notification is detected.

In another embodiment of the invention, a surface computing data processing system is provided. The system includes a computer with memory and at least one processor and a graphics card, a display surface, a projector coupled to the graphics card and projecting a visual display from the graphics card onto a bottom face of the display surface and one or more cameras focused upon a top face of the display surface and providing imagery detected at the top face of the display surface to the computer. The system also includes a smart device notification module executing in the memory of the computer. The module includes program code enabled to register in the memory a placement of multiple different smart devices upon the top face of the display surface, to detecting a notification received in one of the smart devices, and to render in the visual display an indication of a particular one of the smart devices in which the notification is detected.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for smart device notifications in surface computing. In accordance with an embodiment of the invention, a placement of two or more smart devices can be registered on a surface of a surface computing environment. The registration for each of the smart devices can occur by way of near field communications between each of the smart devices and the surface computing environment and can specify for each smart device a corresponding end user and a position of the smart device upon the surface of the surface computing environment. Thereafter, a notification from one of the smart devices can be detected and, in response to the detection, a visual display in the smart computing environment can be presented indicating a receipt of a notification in the one of the smart devices. Optionally, a type of notification further can be indicated in the visual display. As an additional option, a location on the surface of each of the smart devices can be indicated in the visual display.

Figure 1:
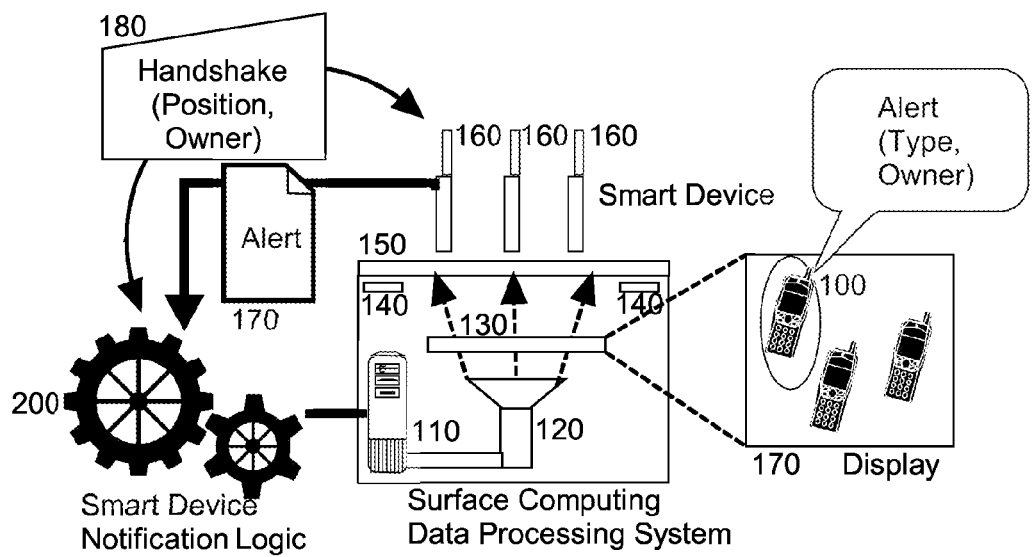
FIG. 1 is a pictorial illustration of an architecture for a surface computing data processing system configured for smart device notifications; and, FIG. 2 is a flow chart illustrating a process for smart device notifications in surface computing.

In further illustration, FIG. 1 pictorially shows an architecture for a surface computing data processing system configured for smart device notifications. As shown in FIG. 1, a surface computing data processing system can include a host computer 110 with memory and at least one processor as well as a display card. The display card can be coupled to a projector 120 so as to drive the projection of a user interface 130 upon a bottom face of a display surface 150. The system also can include different cameras 140, for example infrared cameras, coupled to the host computer 110 and focused upon a top face of the display surface 150 so as to detect physical interactions with the user interface 130. In this way, the host computer 110 can process the user interactions detected by the cameras 140 in lieu of the use of an external keyboard and mouse.

Of note, smart device notification logic 200 can execute in the memory of the host computer 110. The smart device notification logic 200 can include computer executable instructions such that when the instructions are executed in the memory of the host computer 110, the instructions are enabled to initiate a handshake 180 with each of a multiplicity of different smart devices 160, such as mobile phones or tablet computers, placed upon the top face of the display surface 150. For instance, near field communications can be utilized upon detecting through the cameras 140 the placement of each of the smart devices 160 upon the top face of the display surface 150.

Utilizing the near field communications, each of the smart devices 160 can be associated with a corresponding end user. Further, a position of each of the smart devices 160 upon the top face of the display surface 150 can be determined by the cameras 140. As such, the instructions of the smart device notification logic 200 can generate a display 190 visually indicating a positioning of the different smart devices 160 upon the top face of the display surface 150 according to corresponding iconic images of the respectively different smart devices 160.

Of note, responsive to a notification having been received in one of the smart devices 160, for example a notification of an incoming phone call, missed phone call, new voice mail message, new text message, new e-mail message, or social media message, to name only a few examples, an alert 170 can be provided by the one of the smart devices 160 to the smart device notification logic 200 by way of the near field communications. The alert 170 can indicate the type of notification and can identify the one of the smart devices 160. Thereafter, the smart device notification logic 190 can process the alert 170 by generating in the display 170 a visual emphasis 100 of the one of the smart devices 160. Additionally, the display 170 can include an indication of the type of notification and the end user associated with the one of the smart devices 160.

Figure 2:
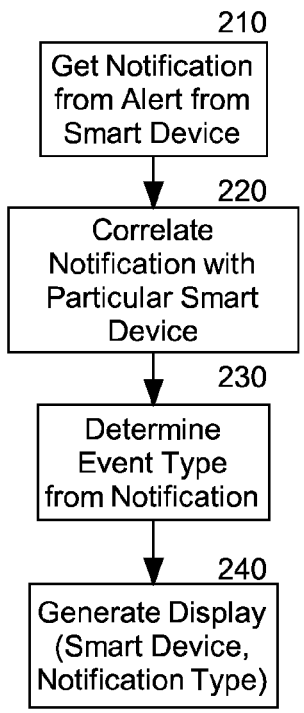

In yet further illustration of the operation of the smart device notification logic 200, FIG. 2 is a flow chart illustrating a process for smart device notifications in surface computing. Beginning in block 210, an alert can be received indicating that a notification has occurred in one of several smart devices placed upon a top surface of a surface computing data processing system. In block 220, the notification can be correlated to a particular one of the smart devices, and in block 230, an event type giving rise to the notification can be determined. Finally, in block 240, a display in the surface computing data processing system can be provided indicating not only the positioning of the smart devices upon the top face of the display surface of the surface computing data processing system, but also the particular one of the smart devices in which the notification has occurred, as well as a type of notification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for smart device notifications in surface computing, the method comprising:
   registering in memory of a surface computing system, a placement of multiple different smart devices upon a surface of the surface computing system;
   detecting a receipt of a notification in one of the smart devices; and,
   rendering in a visual display of the surface computing system, an indication of a particular one of the smart devices in which the receipt of the notification is detected.

2. The method of claim 1, further comprising additionally rendering in the visual display an indication of a type of the notification.

3. The method of claim 1, further comprising additionally rendering in the visual display a positioning of each of the smart devices.

4. A surface computing data processing system, comprising:
   a computer with memory and at least one processor and a graphics card;
   a display surface;
   a projector coupled to the graphics card and projecting a visual display from the graphics card onto a bottom face of the display surface;
   a plurality of cameras focused upon a top face of the display surface and providing imagery detected at the top face of the display surface to the computer; and,
   a smart device notification module executing in the memory of the computer, the module comprising program code enabled to register in the memory a placement of multiple different smart devices upon the top face of the display surface, to detecting a receipt of a notification in one of the smart devices, and to render in the visual display an indication of a particular one of the smart devices in which the receipt of the notification is detected.

5. The system of claim 4, wherein the program code additionally renders in the visual display an indication of a type of the notification.

6. The system of claim 4, wherein the program code additionally renders in the visual display a positioning of each of the smart devices upon the top face.

\* \* \* \* \*